United States Patent [19]

Eichinger

[11] Patent Number: 4,817,846
[45] Date of Patent: Apr. 4, 1989

[54] TRANSMISSION SHAFT SEALING ARRANGEMENT

[75] Inventor: Johann Eichinger, Vaterstetten, Fed. Rep. of Germany

[73] Assignee: Carl Hurth Maschinen- und Zahnradfabrik GmbH & Co., Munich, Fed. Rep. of Germany

[21] Appl. No.: 103,171

[22] Filed: Sep. 30, 1987

[30] Foreign Application Priority Data

Oct. 3, 1986 [DE] Fed. Rep. of Germany ....... 8626535

[51] Int. Cl.[4] ...................... F16J 15/32; F16H 57/00; B61C 9/08
[52] U.S. Cl. ......................................... 277/9; 277/65; 277/82
[58] Field of Search ....................... 277/28, 65, 95, 58, 277/9, 32, 81 R, 147, DIG. 3; 384/140, 143, 482, 484

[56] References Cited

U.S. PATENT DOCUMENTS

| 3,591,188 | 7/1971 | Eisher | 277/9 |
| 4,235,354 | 11/1980 | Aonuma et al. | 277/65 X |
| 4,299,398 | 11/1981 | Wahl | 277/65 |
| 4,552,368 | 11/1985 | Wallace | 277/28 X |
| 4,625,977 | 12/1986 | Azibert et al. | 277/65 X |

Primary Examiner—David Werner
Attorney, Agent, or Firm—Flynn, Thiel, Boutell & Tanis

[57] ABSTRACT

In a seal arrangement between a stationary and a rotating machine part, for example, between a transmission housing and a hollow sleeve exiting from the housing, there are arranged two V-rings oriented concentrically to one another in the one machine part, the lips of the seals cooperating with the other machine part. To extend the service life of the seal arrangement, a first V-ring is first in an effective position and a second V-ring is supported for movement from a noneffective position (A) into an effective position (B) at a later time by means of a device which can be operated from outside.

15 Claims, 2 Drawing Sheets

TRANSMISSION SHAFT SEALING ARRANGEMENT

FIELD OF THE INVENTION

The invention relates to a seal arrangement encircling the output shaft of a transmission housing.

BACKGROUND OF THE INVENTION

In transmission structures for street cars, underground railways and similar rail vehicles, labyrinth seals are often provided at the exit of the driven shaft extending out of the transmission housing in order to prevent penetration of spraying water and dirt into the interior of the transmission housing. These seals have proven to be successful. However, they are not sufficient when the vehicles must travel over flooded rail systems, which is often necessary during flood conditions. Transmission housings equipped with lip seals must be provided in such cases. Because of the wear of the seal lips caused by dust, dirt and influences of this nature, such seals have, as a rule, only a short service life, shorter than the time period between two inspections of the vehicles. A replacing of the seals within the time period between inspections is considered by the vehicle operators to be an imposition because of the enormous amount of work (the drive wheels and, if necessary, also the braking disks and the joint couplings must for this purpose be removed from the axle and must later on again be mounted) and the thus encountered expenses (longer down time of the vehicle). The arrangement of three lip seals acting one behind the other, as this is known from the Reference "FORSHEDA V-RING" of the Firm M. Merkel GmbH & Co. KG Hamburg (1982), Page 30, does not permit one to expect a significant service life extension.

Starting out from the abovesetforth deficiencies of known transmission seals, the basic purpose of the invention is to provide a transmission housing with a seal which functions satisfactorily and reliably over a long time period.

SUMMARY OF THE INVENTION

The abovesetforth purpose is attained with a transmission housing seal comprised of first and second V-rings arranged concentrically to one another, the first V-ring being fixed in an effective or active position and the second V-ring is supported for movement between an ineffective position and an effective position. The significant difference between the invention and the arrangement of two V-rings known from the mentioned reference of the Firm Merkel consists in only one V-ring being effective or active, while the other one remains intentionally functionless until needed at a future time.

The aforementioned inventive transmission housing seal has the important advantage that initilly only the one lip seal, that is the one V-ring, is effective, while the second one is in a functionless position. Only at a later time, for example after a time interval equal to the first half of the time period between two inspections is over, the second seal is moved into its effective position. This can be done from an external location without much work, in particular no structural parts need to be pulled off from the axles.

The second V-ring is moved in a simple manner by means of pressure screws accessible from outside, which act either directly or through a pressure disk onto the V-ring. The required distance of movement of the second V-ring can be maintained without any problems by means of correspondingly thick disks which are removed. The second V-ring can also after loosening of suitable holding screws be moved by means of spring force into its effective position. A stop is thereby very useful.

The radially spaced arrangement of the V-rings facilitates a short structural length of the seal; particularly in the case of transmissions for rail vehicles arranged in the bogie whereat there is generally only little space available for the motor-transmission connection. One single sealing surface for both V-rings which are effective on various diameters is favorable with respect to manufacturing expenses. To protect the second V-ring in its noneffective position, rough dirt etc. are to be kept away from it; otherwise, there exists the risk that the second V-ring is already damaged before it is to become effective. This can be achieved when the two V-rings are arranged within a known seal labyrinth.

BRIEF DESCRIPTION OF THE DRAWINGS

Two exemplarY embodiments of the invention are illustrated in the drawings, in which.

DETAILED DESCRIPTION

Figure 1:
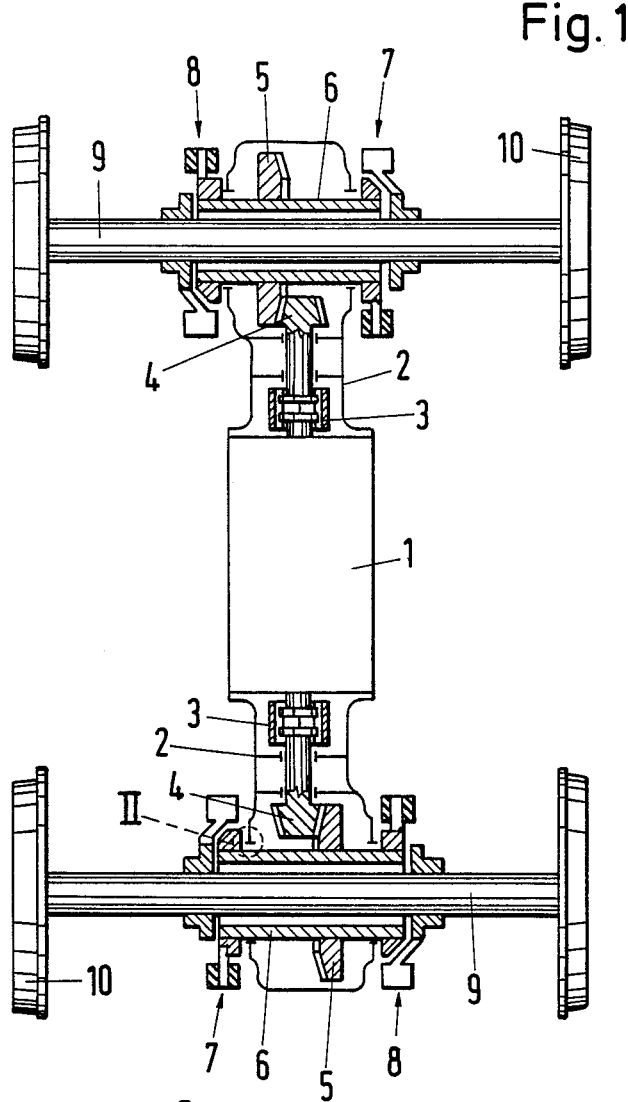
FIG. 1 shows a double-axle drive for a rail vehicle in a much simplified design (the invention can, however, also be used for other purposes)

A bevel gear is connected to both ends of a drive shaft of a drive motor 1, which lies in longitudinal direction of a bogie (not illustrated). The housing for the bevel gear is identified by the reference numeral 2. The power is transmitted from the motor 1 onto the pinion gear 4 of the transmission gear through a toothed coupling 3. The pinion shaft 4 meshingly engages a bevel gear 5 which is fixedly mounted against rotation on a hollow shaft or sleeve 6. The hollow sleeve 6 is supported—just like the pinion shaft 4—rotatably with conventional and therefore not illustrated means. The hollow sleeve is, however, not axially moveable in the housing 2. Both ends of the hollow sleeve 6 extend out of the housing 2. First coupling halves of elastic couplings 7, 8 are fixed against rotation and axially nonmovably mounted on the opposite ends of the sleeve 6. Associated second coupling halves are fixed against rotation and axially nonmovably mounted on an axle 9. The axle 9 is guided through the interior of the hollow sleeve 6 and carriers drive wheels 10 for the rail vehicle at its ends. As much radial play as is needed for the spring suspension of the drive unit, plus a certain safety, exists in the relieved condition between the inner wall of the hollow sleeve 6 and the outer surface of the wheel-set axle 9. The support for the wheel set in the bogie and a disk brake arranged, if necessary, between a rubber-joint coupling on each wheel-set axle and the adjacent drive wheel 10 are not illustrated. These elements are known and are of no importance for the invention.

Figure 2:
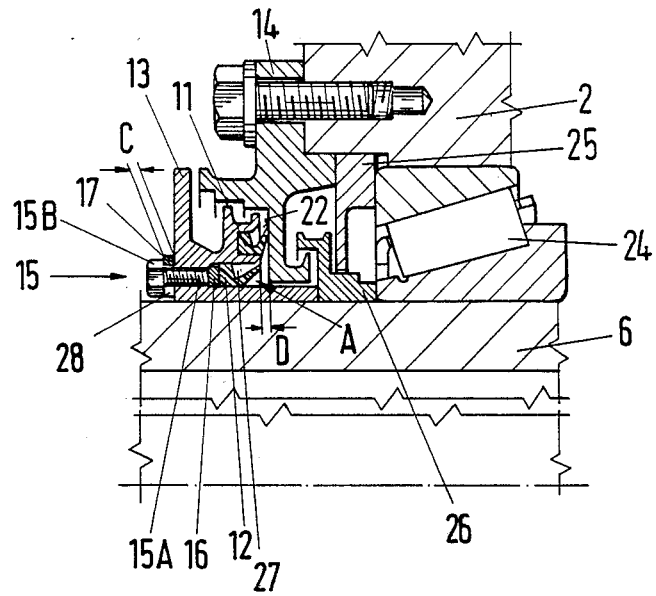
FIG. 2 is a cross-sectional view of an inventive transmission seal with the functionless second seal.

The area in FIG. 1 identified by the roman numeral II is illustrated in detail in FIG. 2. The hollow sleeve 6 is supported in the housing 2 by means of roller bearings 24. A machine part 13 designed as a labyrinth ring, and also a further labyrinth ring 26 are shrunk fit onto the hollow sleeve 6. The machine part 13 has a pair of annular, axially facing grooves therein for housing separately a first V-ring 11 and a second V-ring 12, the first V-ring surrounding the second V-ring and having a radial spacing therebetween. The lip of the first V-ring 11 rests on a sealing surface 22 which is provided on a part of another machine part 14 and which is designed as a labyrinth ring secured by bolts to the housing 2. The labyrinth ring also fixes the location of the outer ring of the roller bearing 24 in axial direction through the use of an intermediately positioned wash plate 25.

Figure 5:
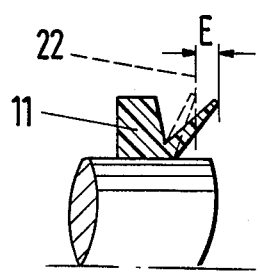
FIG. 5 shows a V-ring in an again enlarged illustration.
Figure 3:
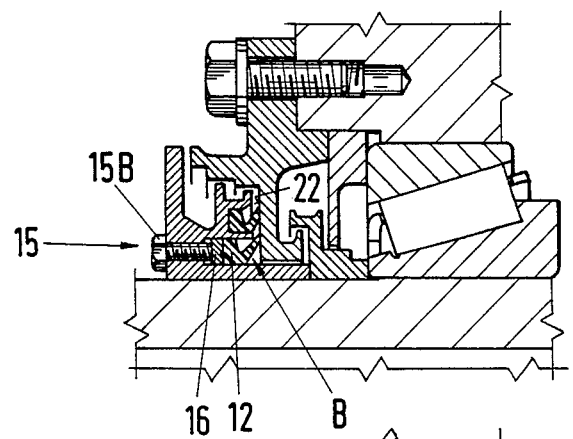
FIG. 3 shows the same arrangement as FIG. 2, however, with the second seal being in an effective position.

Several screws 15 are screwed into the machine part 13 in such a manner that their thread end 15A rests on a pressure plate 16 positioned axially behind the V-ring 12 in the recess or annular groove 27 receiving the second V-ring 12 in a position A. Disks 17 are inserted between the screwheads 15B and the machine part 13, the thickness C of which corresponds with the distance D that the sealing lip of the V-ring 12 is spaced from the sealing surface 22 plus a measure E representing the amount that the V-ring 12 is deformed in its effective position (FIG. 5). The second V-ring 12 serves so to speak as a replacement seal, which is only to be used after the first V-ring 11 has reached its regular life expectancy. The inventive arrangement makes this possible without having to disassemble any parts of the drive unit or of the bogie or to work in narrow spaces. It is sufficient to loosen the screws 15 to remove the disks 17, provided with a slot 28, and to screw in the screws 15 until their heads 15B rest on the machine part 13 (FIG. 3). The pressure plate 16 and with it the second V-ring 12 is thereby moved to the right into a position B as shown in FIG. 3, whereat the sealing lip of the V-ring 12 will rest on the sealing surface 22. If one assumes that the service life of a V-ring is at least 2 to 3 years, then it is sufficient to renew both V-rings 11, 12 during an inspection occurring every five to six years and to thereby install the second V-ring 12 in the position A illustrated in FIG. 2.

Figure 4:
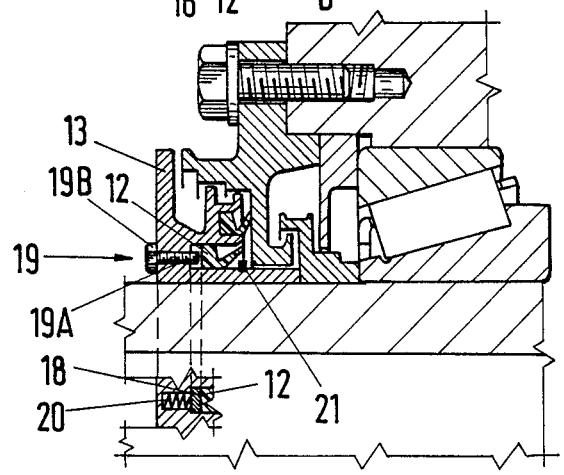
FIG. 4 shows a transmission seal modified as compared with the arrangement according to FIG. 2.

A slightly different arrangement of the second V-ring 12 is shown in FIG. 4, namely again in the position A. The screws identified here by the reference numeral 19 penetrate through the machine part 13 and are screwed with their thread ends 19A into a pressure plate 18. The screwheads 19B rest on the machine part 13. Pressure springs 20 are arranged between the screws 19 in the machine part 13, which pressure springs are initially compressed. In order to move the second V-ring 12 into an effective position B after the first V-ring 11 has worn, or otherwise at approximately the half way point of the inspection time period, the screws 19 are removed. The pressure springs 20 then move the pressure plates 18 to the right as shown in FIG. 4, which causes the second V-ring to be moved into the position B (not illustrated here). In order for the sealing lips not to be pressed too strongly against the sealing surface 22, a stop 21 in the form of a snap ring is provided.

The labyrinth seal, which is usually only provided, is supported effectively with the described seal arrangements. The wear occurring at the sealing lps and at the sealing surface 22 is thereby reduced to a minimum since the V-rings are stored in the rotating part of the labyrinth assemblage and the contact pressure of the sealing lips is reduced at an increasing speed.

The invention is not limited to the illustrated and described exemplary embodiments and the embodiments of application. Modifications are also possible. For example, each V-ring 11, 12 may have a separate sealing surface; or the V-rings are axially offset to one another.

The embodiments of the invention in which an exclusive property or privilege is claimed are defined as follows:

1. In a transmission means having a rotating machine part protruding from a stationary part of said transmission means and a transmission shaft sealing arrangement oriented between said stationary part and said rotating machine part for purposes of protecting an inner chamber of said transmission housing from water and dirt entering said transmission housing, said transmission shaft sealing means including a first seal ring means and a second seal ring means arranged concentrically to one another on said rotatable machine part, said first and second seal ring means both cooperating with seal surface means on said stationary part, said first seal ring means having a first V-ring seal ring with a first lip and being fixed in an active position wherein said first lip engages said seal surface means on said stationary part, the improvement wherein said second seal ring means includes a second V-ring seal ring with a second lip and support means for supporting said second seal ring for axial movement on said rotatable machine part between a not active position wherein said second lip is spabed from said stationary part and an active position wherein said second lip engages said stationary part., wherein said support means includes a manually adjustable means operable from a location externally of said transmission housing, and wherein said manually adjustable means includes plural externally threaded screws with screwheads accessible from said location and extending into said rotatable machine part on which is mounted said first and second V-ring seal rings so that the externally threaded ends engage said second V-ring seal ring and cause the screw-in depth of said screws to determine the position of said second V-ring seal ring relative to said stationary part.

2. The device according to claim 1, including a pressure plate interposed between said threaded ends of said screws and said second V-ring seal ring.

3. The device according to claim 1, including plural disks interposed between said screwheads and said rotatable machine part, the thickness of each of said disks corresponding to the sum of the maximum distance of travel of said second lip of said second V-ring seal ring to engagement with said rotatable machine part and the amount of axial deformation of said second lip required to effect a seal.

4. The device according to claim 1, including a stop for said second V-ring seal ring at said active position thereof.

5. The device according to claim 1, wherein said first V-ring seal ring surrounds said second V-ring seal ring at least partially with a radial spacing therebetween.

6. The device according to claim 5, wherein said seal surface means is a radially extending, axially facing sealing surface, and wherein said first and second lips both engage said sealing surface.

7. The device according to claim 1, wherein said second seal ring means includes means for protecting said second V-ring seal ring from at least rough dirt and sprayed water when spaced from said seal surface means.

8. The device according to claim 1, wherein both said first V-ring seal ring and also said second V-ring seal ring are arranged within a chamber sealed off by at least one labyrinth seal.

9. In a transmission means having a rotating machine part protruding from a stationary part of said transmission means and a transmission shaft sealing arrangement oriented between said stationary part and said rotating machine part for purposes of protecting an inner chamber of said transmission housing from water and dirt entering said transmission housing, said transmission shaft sealing means including a first seal ring means and a second seal ring means arranged concentrically to one another on said rotatable machine part, said first and second seal ring means both cooperating with seal surface means on said stationary part, said first seal ring means having a first V-ring seal ring with a first lip and being fixed in an active position wherein said first lip engages said seal surface means on said stationary part, the improvement wherein said second seal ring means includes a second V-ring seal ring with a second lip and support means for supporting said second seal ring for axial movement on said rotatable machine part between a not active position wherein said second lip is spaced from said stationary part and an active position wherein said second lip engages said stationary part, wherein said support means including manually adjustable means operable from a location externally of said transmission housing, wherein said manually adjustable means includes a pressure plate and plural externally threaded screws extending through said rotatable machine part on which is mounted said first and second V-ring seal rings, and into threaded engagement with said pressure plate, wherein compressed spring means is provided between said rotatable machine part and said pressure plate and is held in the compressed condition by said screws, and wherein said second V-ring seal ring is oriented between said pressure plate and said seal surface means, whereby an unconnecting of said plural screws from said threaded engagement with said pressure plate causes said compressed spring means to expand and effect a moving of said pressure plate and said second V-ring seal ring toward said seal surface means to compress said second V-ring seal ring and said second lip therebetween and effect a seal thereat.

10. The device according to claim 9, including a stop for said second V-ring seal ring at serial active position.

11. The device according to claim 9, wherein said first V-ring seal ring surrounds said second V-ring seal ring at least partially with a radial spacing therebetween.

12. The device according to claim 11, wherein said seal surface means is a radially extending, axially facing sealing surface, and wherein said first and second lips both engage said sealing surface.

13. The device according to claim 9, wherein said second seal ring means includes means for protecting said second V-ring seal ring from at least rough dirt and sprayed water when spaced from said seal surface means.

14. The device according to claim 9, wherein both said first V-ring seal ring and also said second V-ring seal ring are arranged within a chamber sealed off by at least one labyrinth seal.

15. In a transmission means having a rotating machine part protruding from a stationary part of said transmission means and a transmission shaft sealing arrangement oriented between said stationary part and said rotating machine part for purposes of protecting an inner chamber of said transmission housing from water and dirt entering said transmission housing, said transmission shaft sealing means including a first seal ring means and a second seal ring means arranged concentrically to one another on said rotatable machine part, said first and second seal ring means both cooperating with seal surface means on said stationary part, said first seal ring means having a first V-ring seal ring with a first lip and being fixed in an active position wherein said first lip engages said seal surface means on said stationary part, the improvement wherein said second seal ring means includes a second V-ring seal ring with a second lip and support means for supporting said second seal ring for axial movement on said rotatable machine part between a not active position wherein said second lip is spaced from said stationary part and an active position wherein said second lip engages said stationary part, wherein said support means includes a manually adjustable means operable from a location externally of said transmission housing, wherein said rotatable machine part is fixedly mounted on a transmission shaft, wherein said stationary part includes means defining a chamber in which is provided said first and second V-ring seal rings, and wherein labyrinth seal means, defined by conformingly shaped surfaces on mutually opposing surfaces of said rotatable machine part and said stationary part is provided on a side of said first and second V-ring seal rings remote from said transmission shaft.

* * * * *

UNITED STATES PATENT AND TRADEMARK OFFICE
CERTIFICATE OF CORRECTION

PATENT NO. : 4 817 846
DATED : April 4, 1989
INVENTOR(S) : Johann EICHINGER

It is certified that error appears in the above-identified patent and that said Letters Patent is hereby corrected as shown below:

Column 4, line 31; change "spabed" to ---spaced---.
Column 5, line 51; change "serial" to ---said---.

Signed and Sealed this

Fourteenth Day of November, 1989

Attest:

JEFFREY M. SAMUELS

*Attesting Officer*     *Acting Commissioner of Patents and Trademarks*